(12) United States Patent
Yonenaka et al.

(10) Patent No.: US 6,754,068 B2
(45) Date of Patent: Jun. 22, 2004

(54) ENCLOSURE FOR A NETWORK COMMUNICATIONS MODULE

(75) Inventors: Tom Yonenaka, Daly City, CA (US); Phil Cole, Redwood City, CA (US)

(73) Assignee: Network Equipment Technologies, Fremont, CA (US)

( * ) Notice: Subject to any disclaimer, the term of this patent is extended or adjusted under 35 U.S.C. 154(b) by 28 days.

(21) Appl. No.: 10/286,474

(22) Filed: Oct. 31, 2002

(65) Prior Publication Data

US 2004/0085714 A1 May 6, 2004

(51) Int. Cl.$^7$ ................................................. G06F 1/16
(52) U.S. Cl. ........................ 361/679; 312/194; 174/68.3
(58) Field of Search ................................. 361/679–687, 361/724–727; 222/1; 99/450.1, 450.7; 209/630, 900, 942; 174/68.3, 69, 72 A; 312/223, 194; 52/36.1

(56) References Cited

U.S. PATENT DOCUMENTS 6,449,909 B1 * 9/2002 Baloga et al. ................ 52/36.1
6,594,150 B2 * 7/2003 Creason et al. .............. 361/727
2001/0049465 A1 * 12/2001 Goldberg et al. ............. 600/22

* cited by examiner

Primary Examiner—Hung Van Duong
(74) Attorney, Agent, or Firm—Townsend and Townsend and Crew LLP

(57) ABSTRACT

An electronic device in the form of a network communications module that includes a housing that defines an envelope and a vertical, substantially T-shaped routing channel within the envelope. The housing further defines a horizontal routing channel within the envelope that is in communication with the T-shaped routing channel. A plurality of boards is arranged vertically within the housing and at least one board includes input-output ports. At least one communication conduit is coupled to an input-output port. Boards that include input-output ports are recessed with respect to the envelope and are arranged such that the input-output ports are adjacent the T-shaped routing channel. Communication conduits are routed through at least a portion of at least one of the routing channels. Support walls are provide within the housing that help prevent cross-talk and redundancy is provided in some of the device's components and functions.

32 Claims, 3 Drawing Sheets

ENCLOSURE FOR A NETWORK COMMUNICATIONS MODULE

CROSS-REFERENCES TO RELATED APPLICATIONS

NOT APPLICABLE

STATEMENT AS TO RIGHTS TO INVENTIONS MADE UNDER, FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

1. Field of the Invention

The present invention relates to a vertical enclosure for an electronic device, and more particularly, to a vertically oriented enclosure for a network communications module that facilitates input-output cable management.

2. Description of the Prior Art

The amount of data communicated through networks, such as the Internet, is increasing dramatically. To meet the increased demand for network bandwidth, data networks that transfer data at faster and faster rates have been developed. As the new networks are developed, more and more equipment is required for handling the data transfer. Thus, telecommunications systems are becoming larger, more complex and greater in number.

Such telecommunication systems generally include numerous telecommunication network modules within the system. These modules usually include various components in the form of circuit boards or modules, many of which are plug-in modules. Many of these modules provide input-output for the network communication module. These input-outputs couple the network communication modules to the overall network within the telecommunication system. Generally, communication conduits in the form of cables are used to couple the input-output ports on the network communication module to other network communication modules or components or to the telecommunication system or network.

Generally, it is difficult to organize and manage the cables. This is especially true since the network communication modules have become increasingly more complex and therefore, require more cables. Furthermore, in order to provide easy access in interchangeability of plug-in modules, the cables are coupled to the front of the network communication module and thus, the cables are exposed to passersby. This leads to the problem of keeping the cables out of the way of passersby and avoiding having the cables inadvertently bumped and thereby decoupled from the network communication module.

Additionally, with larger network communication modules, it is important to isolate the network data processors and other components from electrical signals or "crosstalk." Also, with the larger network communication modules it is important to provide enclosures that have adequate support. Finally, it is important to have backup network data processors to help ensure reliability of the system.

SUMMARY OF THE INVENTION

The present invention provides an electronic device that includes a housing that defines an envelope and a vertical routing channel within the envelope. The housing further defines a horizontal routing channel within the envelope that is in communication with the vertical routing channel. A plurality of boards is arranged vertically within the housing and at least one board includes input-output ports. At least one communication conduit is coupled to an input-output port. Boards that include input-output ports are recessed with respect to the envelope and are arranged such that the input-output ports are adjacent the vertical routing channel. Communication conduits are routed through at least a portion of at least one of the routing channels.

In accordance with one aspect of the present invention, the vertical routing channel is substantially T-shaped.

In accordance with one aspect of the present invention, the electronic device is a network communications module and the plurality of boards includes four network data processors (NDP), eight input-output modules, including input-output ports, two multi-function cards (MFC) including input-output ports and two power entry modules.

In accordance with another aspect of the present invention, two vertical dividers extend from the front of the housing to the back of the housing. The first of the dividers is adjacent to a first two of the NDPs and is coupled to the back wall of the housing. The second of the dividers is adjacent to a second two of the NDPs and is coupled to the back wall.

In accordance with a further aspect of the present invention, the electronic device includes a fan tray within the housing.

In accordance with a yet another aspect of the present invention, the power entry modules and MFCs are also adjacent to the T-shaped routing channel.

In accordance with a further aspect of the present invention, the electronic device includes a cover that at least partially covers the routing channels.

In accordance with another aspect of the present invention, the envelope is in a range of 16.8 and 17.8 inches long, 10.5–11.5 inches deep and 24.0–25.0 inches high.

In accordance with another aspect of the present invention, the boards that are recessed are recessed in a range of 1.0–2.5 inches.

In accordance with another aspect of the present invention, the envelope is substantially 17.3 inches long, 11.0 inches deep and 24.5 inches high.

The preferred exemplary embodiments of this invention will now be discussed in detail. These embodiments depict the novel and nonobvious electronic device arrangements and methods of this invention shown in the accompanying drawings, which are included for illustrative purposes only, with like numerals indicating like elements.

DETAILED DESCRIPTION OF THE INVENTION

Figure 1:
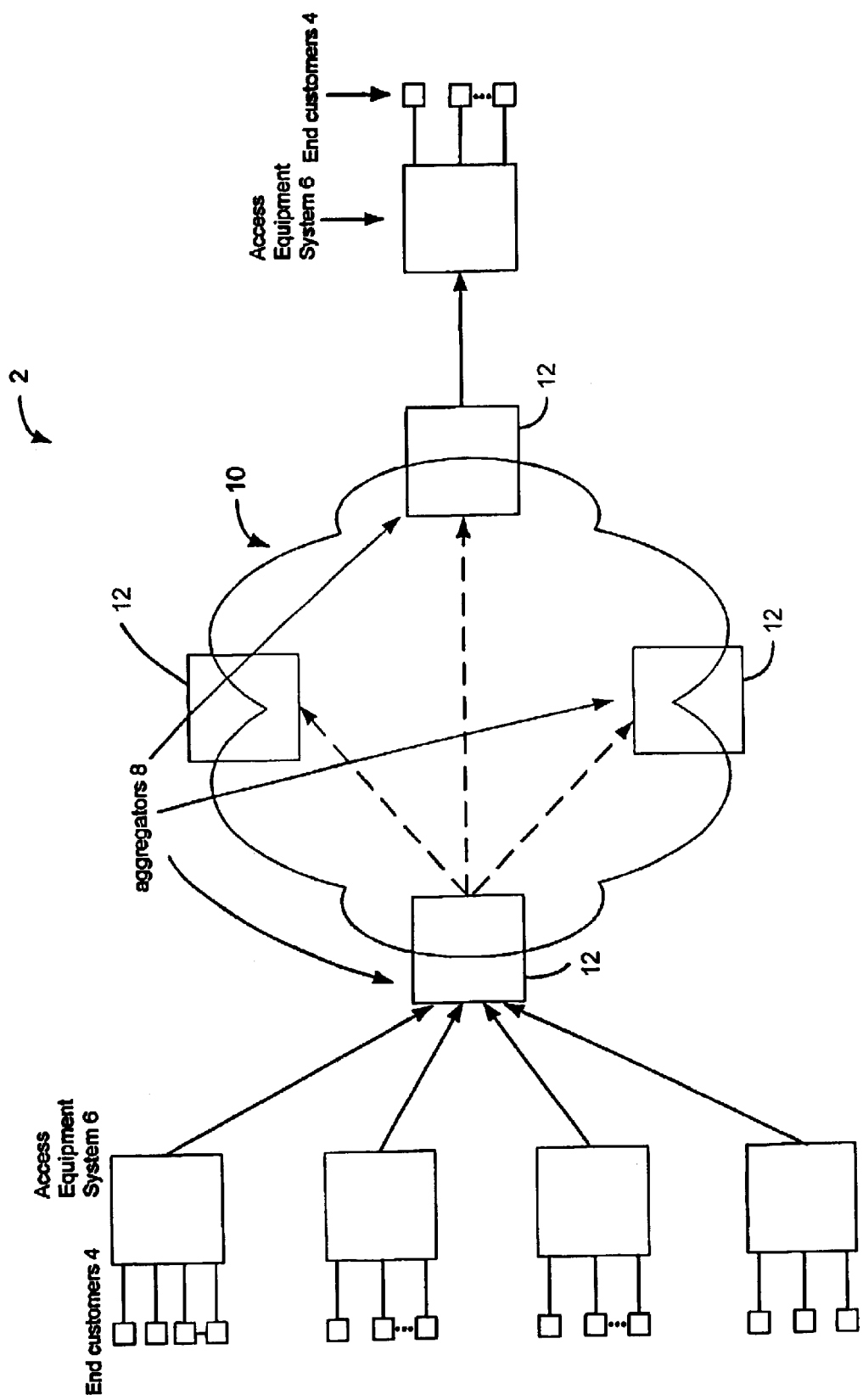
FIG. 1 depicts a simplified block diagram of a telecommunications system.

FIG. 1 depicts a simplified block diagram of a telecommunications system 2 according to one embodiment of the present invention. Telecommunications system 2 includes end customer devices 4, access equipment 6, aggregators 8, and a network 10.

End customer devices 4 are computing devices, such as personal computers (PCs), workstations, personal digital assistants (PDAs), cellular phones, personal PCs, and the like, that communicate data. The data are transmitted to access equipment system 6 through communication lines.

Access equipment systems 6 aggregate and multiplex the data received from end customer devices 4. Examples of access equipment systems 6 include digital subscriber line access multiplexer (DSLAM), multiplexers, etc. Data received at access equipment systems 6 are then sent to aggregators 8. Data from a single access equipment system 6 are typically sent in a specific data format and a specific data rate. For example, the data formats include SONET/SDH (OC3, OC12, OC48, etc.), DS3/E3, Ethernet, Gigabit Ethernet, etc. Data in these formats are also transferred at various data rates, where a fixed data rate is associated with a format Aggregator 8 receives the data from access equipment systems 6 in the different formats. Aggregator 8 processes the data in the different formats and may send the data to one or more other aggregators 8. Data may be sent in different formats than the received data format. Data are then sent to access equipment system 6 and to another end customer 4 through network 10. Network 10 may be any network, such as the Internet.

A plurality of network communication modules 12 are provided within network 10 to receive data from a variety of ports. Network communications modules 12 generally are in the form of computer-type devices that include a housing with a plurality of electronic circuit boards or cards. Many of these are in the form of plug-in modules that are slid into guides within the housing. The plug-in modules are often latched into place to secure them within the guides.

Figure 2:
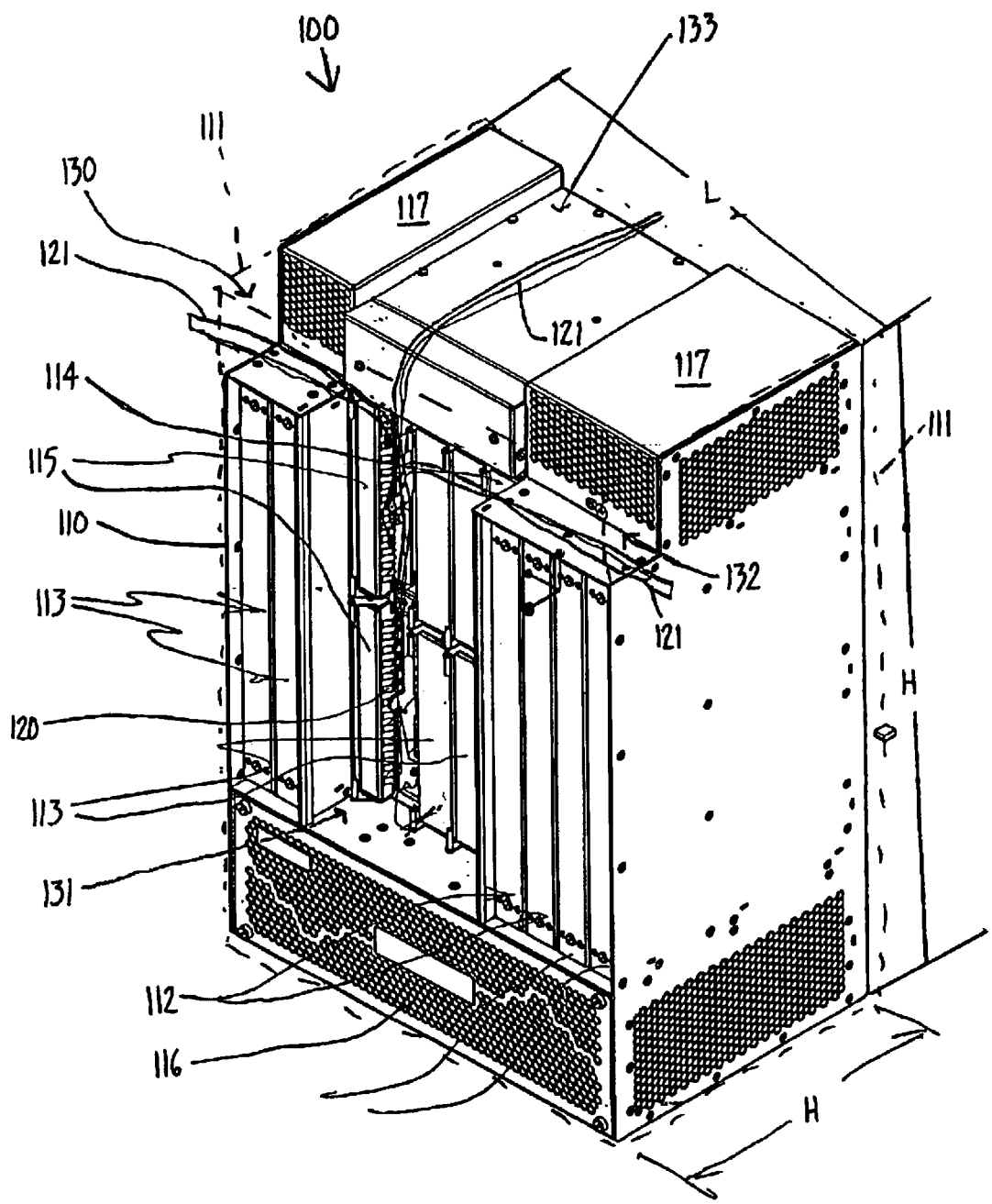
FIG. 2 is a perspective view of an electronic device, such as a network communication module, in accordance with the present invention.

FIG. 2 illustrates an electric device 100 in accordance with the present invention. The device includes a housing 110 that defines an envelope 111. The envelope is defined by dimensions H, L, and D. The device includes a plurality of electronic circuit boards or cards. Many of these are in the form of plug-in modules that are usually removable and interchangeable.

In a preferred embodiment, the electronic device is a network communications module 12 and thus, includes network data processors 112, plug-in modules 113, power entry modules 114, and multifunction cards 115. A fan 116 is also preferably included. As can be seen, the fan is located near the bottom of the network communications module and the device further includes exhaust plenums 117 located near the top of the device. Thus, the fan intakes air from the bottom of the device and moves it across the boards of the device. The air exits out of the exhaust plenums.

Some of the boards include input/output terminals 120. Thus, communication conduits 121, preferably in the form of cables or wires, are coupled to the input/output ports. The communication conduits are then routed to other devices or to network 10 so that the network communication modules may communicate with the telecommunication system.

As can be seen in FIG. 1, a routing channel 130 is defined by the housing. Thus, boards with input/output ports are recessed within the envelope defined by the electronic device. Other boards may also be adjacent the routing channel, and therefore recessed. In the example illustrated in FIG. 1, plug-in modules 113 and power modules 114 are also recessed in addition to the multi-function cards 115 that include input/output ports.

Preferably, the routing channel is substantially T-shaped and thus, has a vertical component 131 and a horizontal component 132. Additionally, the routing channel also preferably includes an upper horizontal component 133 extending across the top of the device.

Thus, communication conduits 121 coupled to input/output ports 120 on the electronic device are routed through a portion of the routing channel. Thus, the communication conduits are not exposed outside the envelope of the electronic device. This helps prevent the communication conduits from being accidentally bumped or torn from the input/output ports. Additionally, the routing channel helps in the organization and arrangement of the communication conduits.

Figure 3:
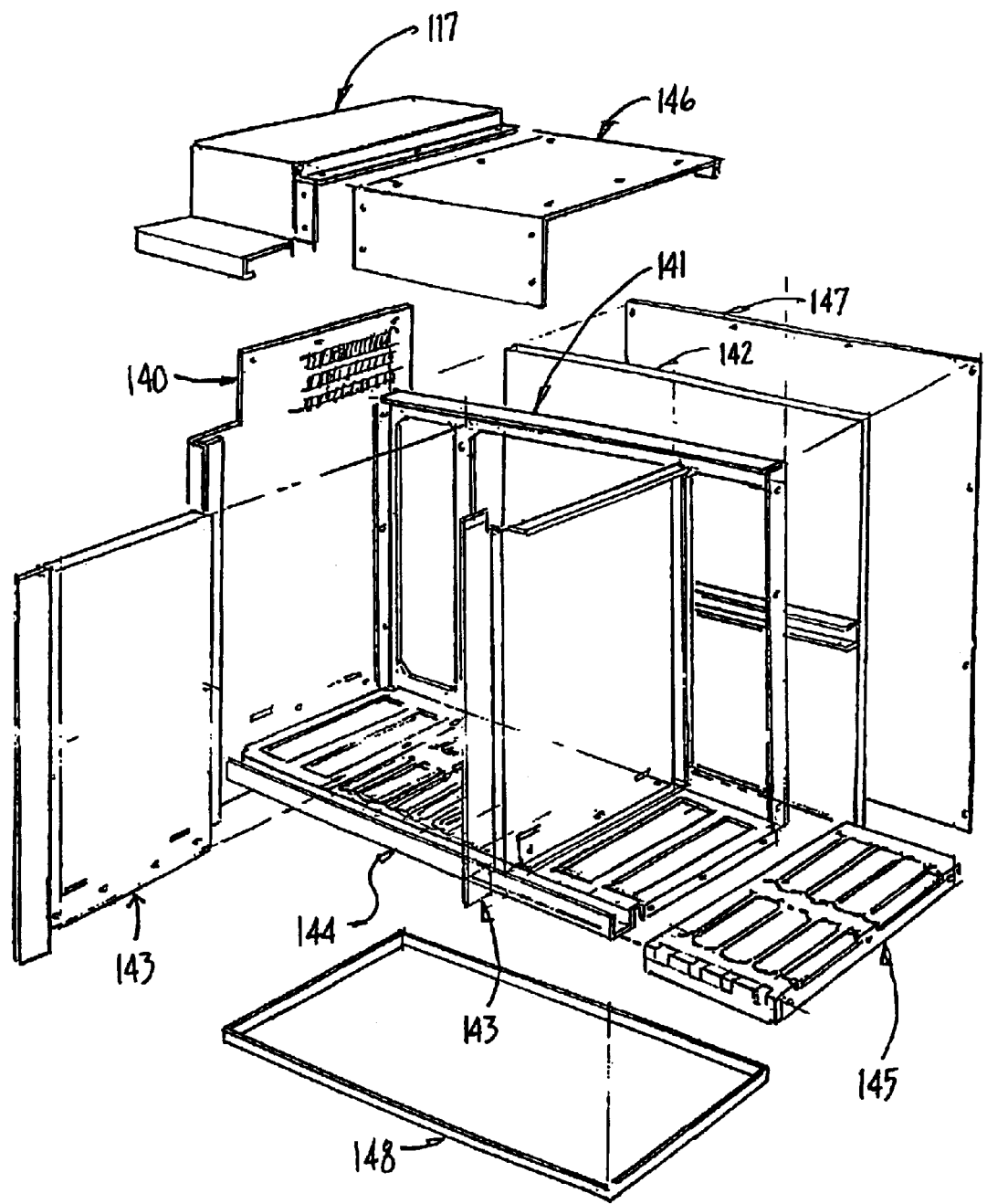
FIG. 3 is an exploded view of an enclosure for the electronic device illustrated in FIG. 1.

FIG. 3 illustrates an exploded view of the housing for the enclosure of the electronic device. The enclosure includes a left side panel 140 and a mirroring right side panel (not shown). A back plane frame 141 and back plane 142 are provided and two support walls 143 that are coupled to the back plane frame are also provided. The two support walls are also coupled to a primary card guide 144. A secondary card guide 145 is placed over the primary card guide adjacent each side wall (only the secondary card guide for the right side is illustrated). The exhaust plenums are also included (only the left one is illustrated in FIG. 3) and a top central cover 146 is also provided along with a rear cover 147 and a bottom cover 148.

The support walls help provide strength and stability to the overall enclosure. Additionally, because the network data processors are preferably on the left and right hand side, the support walls help prevent cross-talk with regard to each other and the other electronic circuit boards and modules within the device.

As can be seen in the figures, multiple network data processors are preferably provided. Preferably, the network data processors each include two modules, one of which is redundant. Additionally, the housing preferably includes slots 150 for extra modules or circuit boards for expansion purposes (illustrated with modules therein).

An example of dimensions for the envelope are in a range of 2 ½"–11 ½" deep, with 11 inches being a preferred depth; 16.8"–17.8" long, with 17.3 inches being a preferred length; and 24"–25" high, with 24.5 inches being a preferred height. Preferably, the components for the housing are stamped or cut from sheet metal.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An electronic device comprising:
    a housing that defines an envelope and a vertical, substantially T-shaped routing channel within the envelope, the housing further defining a horizontal routing channel within the envelope that is in communication with the T-shaped routing channel;
    a plurality of boards arranged vertically within the housing, at least one board including input/output ports; and
    at least one communication conduit coupled to an input/output port;
    wherein boards that include input/output ports are recessed with respect to the envelope and are arranged such that the input/output ports are adjacent the T-shaped routing channel; and wherein communication conduits are routed through at least a portion of at least one of the routing channels.

2. An electronic device in accordance with claim 1 wherein the electronic device is a network communications module and the plurality of boards comprises four network data processors (NDP), eight input/output modules including input/output ports, two MFCs and two power entry modules.

3. An electronic device in accordance with claim 1 further comprising a cover that at least partially covers the routing channels.

4. An electronic device in accordance with claim 1 wherein the envelope is in a range of 16.8–17.8 inches long, 10.5–11.5 inches deep and 24.0–25.0 inches high.

5. An electronic device in accordance with claim 2 further comprising two vertical dividers extending from a front of the housing to a back of the housing, a first of the dividers being adjacent to a first two of the NDPs and coupled to a back wall of the housing, and a second of the dividers being adjacent to a second two of the NDPs and coupled to the back wall.

6. An electronic device in accordance with claim 2 further comprising a fan tray within the housing.

7. An electronic device in accordance with claim 2 wherein the power entry modules and MFCs are also adjacent the T-shaped routing channel.

8. An electronic device in accordance with claim 4 wherein the boards that are recessed are recessed in a range of 1.0–2.5 inches.

9. An electronic device in accordance with claim 4 wherein the envelope is substantially 17.3 inches long, 11.0 inches deep and 24.5 inches high.

10. An electronic device in accordance with claim 9 wherein the boards that are recessed are recessed in a range of 1.0–2.5 inches.

11. A telecommunications system in accordance with claim 10 wherein the plurality of boards comprises four network data processors, eight input/output modules including input/output ports, two MFCs and two power entry modules.

12. A telecommunications system in accordance with claim 10 wherein the network communications module further comprises a cover that at least partially covers the routing channel.

13. An electronic device in accordance with claim 10 wherein the envelope is in a range of 16.8–17.8 inches long, 4.5–5.5 inches deep and 10.5–11.5 inches high.

14. An electronic device in accordance with claim 12 wherein the boards that are recessed are recessed in a range of 1.0–2.5 inches.

15. An electronic device in accordance with claim 12 wherein the envelope is substantially 17.3 inches long, 5.0 inches deep and 11.0 inches high.

16. An electronic device in accordance with claim 14 wherein the boards that are recessed are recessed in a range of 1.0–2.5 inches.

17. A telecommunications system comprising at least one network communications module, the network communications module comprising:

a housing that defines an envelope and a substantially T-shaped routing channel within the envelope, the housing further defining a horizontal routing channel within the envelope that is in communication with the T-shaped routing channel;

a plurality of boards arranged vertically within the housing, at least one board including input/output ports; and at least one communication conduit coupled to an input/output port;

wherein boards that include input/output ports are recessed with respect to the envelope and are arranged such that the input/output ports are adjacent the T-shaped routing channel; and wherein communication conduits are routed through at least a portion of at least one of the routing channels.

18. A telecommunications system in accordance with claim 17, wherein the network communications module further comprises two vertical dividers extending from a front of the housing to a back of the housing, a first of the dividers being adjacent to a first two of the NDPs and coupled to a back wall of the housing, and a second of the dividers being adjacent to a second two of the NDPs and coupled to the back wall.

19. A telecommunications system in accordance with claim 17 further comprising a fan tray within the housing.

20. A telecommunications system in accordance with claim 17 wherein the power entry modules and MFCs are also adjacent the T-shaped routing channel.

21. A method of managing communication conduits within a network telecommunications system, the method comprising:

providing a network communications module that defines an envelope and a vertical, substantially T-shaped routing channel within the envelope;

coupling at least one communication conduit to an input/output port within the network communications module, the input/out port being recessed within the envelope; and routing the communication conduit from the input/output port through the routing channel.

22. A method in accordance with claim 21 wherein the network communications module further defines a horizontal routing channel in communication with the vertical routing channel and the method further comprises routing a communication conduit through both routing channels.

23. An electronic device comprising:

a housing that defines an envelope and a vertical routing channel within the envelope, the housing further defining a horizontal routing channel within the envelope that is in communication with the vertical routing channel;

a plurality of boards arranged vertically within the housing, at least one board including input/output ports; and at least one communication conduit coupled to an input/output port;

wherein boards that include input/output ports are recessed with respect to the envelope and are arranged such that the input/output ports are adjacent the vertical routing channel; and wherein communication conduits are routed through at least a portion of the routing channels.

24. An electronic device in accordance with claim 23 wherein the electronic device is a network communications module and the plurality of boards comprises four network data processors (NDP), eight input/output modules including input/output ports, two MFCs and two power entry modules.

25. An electronic device in accordance with claim 23 further comprising a cover that at least partially covers the routing channels.

26. An electronic device in accordance with claim 23 wherein the envelope is in a range of 16.8–17.8 inches long, 10.5–11.5 inches deep and 24.0–25.0 inches high.

27. An electronic device in accordance with claim 24 further comprising two vertical dividers extending from a front of the housing to a back of the housing, a first of the dividers being adjacent to a first two of the NDPs and coupled to a back wall of the housing, and a second of the dividers being adjacent to a second two of the NDPs and coupled to the back wall.

28. An electronic device in accordance with claim 24 further comprising a fan tray within the housing.

29. An electronic device in accordance with claim 24 wherein the power entry modules and MFCs are also adjacent the vertical routing channel.

30. An electronic device in accordance with claim 25 wherein the boards that are recessed are recessed in a range of 1.0–2.5 inches.

31. An electronic device in accordance with claim 26 wherein the envelope is substantially 17.3 inches long, 11.0 inches deep and 24.5 inches high.

32. An electronic device in accordance with claim 31 wherein the boards that are recessed are recessed in a range of 1.0–2.5 inches.

* * * * *